(12) United States Patent
Liu

(10) Patent No.: US 12,549,371 B1
(45) Date of Patent: Feb. 10, 2026

(54) LONG-TERM ACCESS CONTROL FOR THERAPEUTIC JOURNEY AUTHENTICATION

(71) Applicant: Kwok Hong Liu, Southern (HK)

(72) Inventor: Kwok Hong Liu, Southern (HK)

(*) Notice: Subject to any disclaimer, the term of this patent is extended or adjusted under 35 U.S.C. 154(b) by 0 days.

(21) Appl. No.: 18/679,445

(22) Filed: May 31, 2024

(51) Int. Cl.
| | |
|---|---|
| H04L 9/32 | (2006.01) |
| G06F 21/62 | (2013.01) |
| G06T 11/00 | (2006.01) |
| G10L 17/02 | (2013.01) |
| G10L 17/04 | (2013.01) |
| G10L 17/06 | (2013.01) |

(52) U.S. Cl.
CPC ........ *H04L 9/3221* (2013.01); *G06F 21/6245* (2013.01); *G06T 11/00* (2013.01); *G10L 17/02* (2013.01); *G10L 17/04* (2013.01); *G10L 17/06* (2013.01)

(58) Field of Classification Search
CPC ... H04L 9/3221; G06F 21/6245; G06T 11/00; G10L 17/02; G10L 17/04; G10L 17/06
See application file for complete search history.

(56) References Cited

U.S. PATENT DOCUMENTS

| | | | | |
|---|---|---|---|---|
| 9,892,732 | B1* | 2/2018 | Tian | G10L 15/24 |
| 2001/0034615 | A1* | 10/2001 | Wilkinson | G16H 80/00 |
| | | | | 705/2 |
| 2010/0122093 | A1* | 5/2010 | Tuyls | H04L 9/3218 |
| | | | | 713/180 |
| 2021/0383837 | A1 | 12/2021 | Ren et al. | |
| 2022/0230678 | A1 | 7/2022 | Chakraborty et al. | |
| 2022/0329432 | A1* | 10/2022 | Kawaguchi | H04L 9/3247 |
| 2022/0383921 | A1 | 12/2022 | Rizzolo et al. | |
| 2023/0087557 | A1* | 3/2023 | Dai | H04L 9/3073 |
| | | | | 713/160 |

* cited by examiner

*Primary Examiner* — Vance M Little
(74) *Attorney, Agent, or Firm* — W&P; Wai P. Leung

(57) ABSTRACT

The present invention relates to a system and method for therapeutic engagement and documentation. The system utilizes AI-powered avatars, an interactive virtual environment, and secure sharing capabilities to facilitate a personalized and secure therapeutic experience. Additionally, the invention introduces a knowledge authentication guardrail leveraging Language Models (LLMs) to authenticate a designated trusted person based on knowledge of a therapeutic journey.

12 Claims, 10 Drawing Sheets

```
┌─────────────────────────────────────────────────────────────┐
│ An individual, let's call them John, has been documenting   │
│ their therapeutic journey, including personal experiences   │
│ and reflections, within the therapeutic engagement system.  │
└─────────────────────────────────────────────────────────────┘
                              ↓
┌─────────────────────────────────────────────────────────────┐
│ John decides to share a specific portion or the entirety of │
│ their documented journey with a designated trusted          │
│ individual, Mary, who has been actively involved in their   │
│ life.                                                       │
└─────────────────────────────────────────────────────────────┘
                              ↓
┌─────────────────────────────────────────────────────────────┐
│ John initiates the personalized authentication process and  │
│ designates Mary as the trusted individual who requires      │
│ authentication.                                             │
└─────────────────────────────────────────────────────────────┘
                              ↓
┌─────────────────────────────────────────────────────────────┐
│ The system prompts Mary to provide her consent to undergo   │
│ the personalized authentication process.                    │
└─────────────────────────────────────────────────────────────┘
                              ↓
┌─────────────────────────────────────────────────────────────┐
│ Mary agrees and receives a set of questions generated by    │
│ the LLM guardrail based on the shared journey between John  │
│ and Mary.                                                   │
└─────────────────────────────────────────────────────────────┘
                              ↓
┌─────────────────────────────────────────────────────────────┐
│ The questions are designed to assess Mary's knowledge and   │
│ understanding of specific events, conversations, or         │
│ experiences that have only been shared between John and     │
│ Mary in the documented journey.                             │
└─────────────────────────────────────────────────────────────┘
                              ↓
┌─────────────────────────────────────────────────────────────┐
│ Mary provides her answers to the questions, and the system  │
│ sends the responses to the LLM guardrail for analysis.      │
└─────────────────────────────────────────────────────────────┘
                              ↓
┌─────────────────────────────────────────────────────────────┐
│ Based on the LLM guardrail's analysis, if Mary's answers    │
│ align with the expected knowledge and details of the        │
│ therapeutic journey, the system authenticates Mary as the   │
│ designated trusted individual.                              │
└─────────────────────────────────────────────────────────────┘
                              ↓
┌─────────────────────────────────────────────────────────────┐
│ The LLM guardrail compares Mary's responses with the        │
│ information it has learned about John's journey and         │
│ evaluates the accuracy and consistency of the answers.      │
└─────────────────────────────────────────────────────────────┘
                              ↓
┌─────────────────────────────────────────────────────────────┐
│ Once authenticated, Mary gains access to the specific       │
│ portions or the entirety of John's therapeutic journey as   │
│ authorized by John.                                         │
└─────────────────────────────────────────────────────────────┘
                              ↓
┌─────────────────────────────────────────────────────────────┐
│ If Mary's answers do not match the expected knowledge or    │
│ details of the therapeutic journey, the system denies her   │
│ access and notifies John about the failed authentication    │
│ attempt.                                                    │
└─────────────────────────────────────────────────────────────┘
```

FIG. 5a

Verifier (LLM): Thank you for participating in this authentication process. To establish your authenticity as the designated trusted person, we will engage in an interactive zero-knowledge proof. This proof aims to validate your knowledge of a specific shared therapeutic journey, without revealing any additional information. Are you ready to proceed?

Prover (Designated Trusted Person): Yes, I am ready. I understand the importance of maintaining privacy while verifying my identity as the designated trusted person.

Verifier (LLM): Excellent. Let's begin. Please recall a significant moment from the shared therapeutic journey related to the user's confession about being LGBTQ+. Describe the emotions you felt during that conversation.

Prover (Designated Trusted Person): In that moment, my heart was filled with a mix of fear and love. I was afraid of saying the wrong thing and potentially hurting my child. But above all, my unconditional love for them overcame any doubts or uncertainties. I felt a deep sense of compassion, acceptance, and a desire to support my child wholeheartedly.

Verifier (LLM): Thank you for sharing your emotions during that crucial conversation. Now, recall a specific detail or symbol that was significant to the user during their journey of self-acceptance. Only the user and the designated trusted person should know this detail.

Prover (Designated Trusted Person): During the journey, the symbol that held great meaning for my child was a rainbow butterfly. It represented transformation, resilience, and the beauty of embracing my child's authentic self.

Verifier (LLM): Thank you for providing that specific detail. Finally, let's conclude the interactive zero-knowledge proof by recalling a piece of advice or affirmation you shared with the user during the journey of self-discovery.

Prover (Designated Trusted Person): One piece of advice I offered was, "Embrace your truth, my child, for your authenticity is a gift to the world. You deserve love, acceptance, and happiness, and I will always be here to support you in every step of your journey."

Verifier (LLM): Thank you for your participation in this interactive zero-knowledge proof. Your responses align with the specific knowledge that only the designated trusted person would possess. This confirms authenticity as the intended recipient and underscores the importance of privacy and confidentiality within this system.

FIG. 6a

LONG-TERM ACCESS CONTROL FOR THERAPEUTIC JOURNEY AUTHENTICATION

FIELD OF INVENTION

The present invention relates to the field of therapeutic interventions, particularly in the context of long-term accessibility and authentication.

BACKGROUND

Therapeutic engagement platforms have gained popularity as tools for users to explore unresolved emotions, define and document their therapeutic journeys. Traditionally, unresolved conflicts or the loss of a loved one can significantly impact a user's emotional well-being and hinder their ability to find closure or resolution. Conventional therapeutic interventions may have limitations in addressing these specific needs, especially when it comes to engaging with deceased loved ones or those with unresolved conflicts. Furthermore, the documentation of one's therapeutic journey and the selective sharing of that experience, especially after one's death, often lack effective mechanisms and platforms to ensure privacy, security, and adherence to the user's wishes. Ensuring the privacy and security of personal data within these systems remains a significant concern. Additionally, there is a need to verify the authenticity of a designated trusted person who is granted access to sensitive and personal information shared within the system.

SUMMARY

The present invention enables users to securely share their documented therapeutic journeys and experiences with trusted individuals. The system includes an AI-powered avatar module, an interactive virtual environment module, a documentation module, a selective sharing module, and a knowledge authentication guardrail.

The present invention provides a comprehensive system and method that utilizes AI-powered avatars within a virtual environment to address the unresolved emotional needs of individuals and facilitate the creation of therapeutic journeys. By engaging with virtual representations of deceased loved ones or individuals with unresolved conflicts, users can explore their emotions, express thoughts or feelings, and seek closure or new perspectives. This therapeutic engagement is designed to promote emotional healing and personal growth.

The system incorporates various features to support the therapeutic journey, including legacy planning tools, time compression, milestone tracking, reflection and review mechanisms, and integration with real life. These features enable users to define their therapeutic journeys, accelerate their progress within the virtual environment, track their achievements, reflect on their experiences, and integrate their insights into their real lives.

Moreover, the system offers options for documenting and recording the user's therapeutic journeys within the virtual environment. Users can maintain virtual journals, create audio/video recordings of their interactions, capture screenshots or snapshots of significant moments, or curate virtual scrapbooks. These documented records serve as tangible representations of their therapeutic journeys, capturing memories, achievements, and personal growth.

Furthermore, the system ensures privacy and confidentiality by implementing secure sharing options. Users can selectively share their documented journeys with trusted individuals, including those with unresolved conflicts, either during their lifetime or after their death. The system employs a knowledge authentication guardrail to safeguard the shared content and maintain privacy.

The invention also introduces conditional access controls, time-release mechanisms, and user-controlled revocation to respect the user's wishes regarding the sharing of their therapeutic experience after their death. These features allow for posthumous sharing of the documented journey with designated recipients, ensuring that the content is shared gradually, securely, and in alignment with the user's intentions.

The personalized authentication guardrail emulates the properties of an interactive zero-knowledge proof, where a prover (designated trusted person) and a verifier (LLM) engage in a dialogue that establishes authenticity and verifies shared knowledge without compromising privacy or security.

BRIEF DESCRIPTION OF DRAWINGS

FIGS. 5a and 5b show two examples of documenting journeys on a therapeutic engagement system.

FIGS. 6a, 6b and 6c show three exemplary conversations structured by a knowledge authentication guardrail to emulate properties of a zero-knowledge proof.

DETAILED DESCRIPTION

Figure 1:
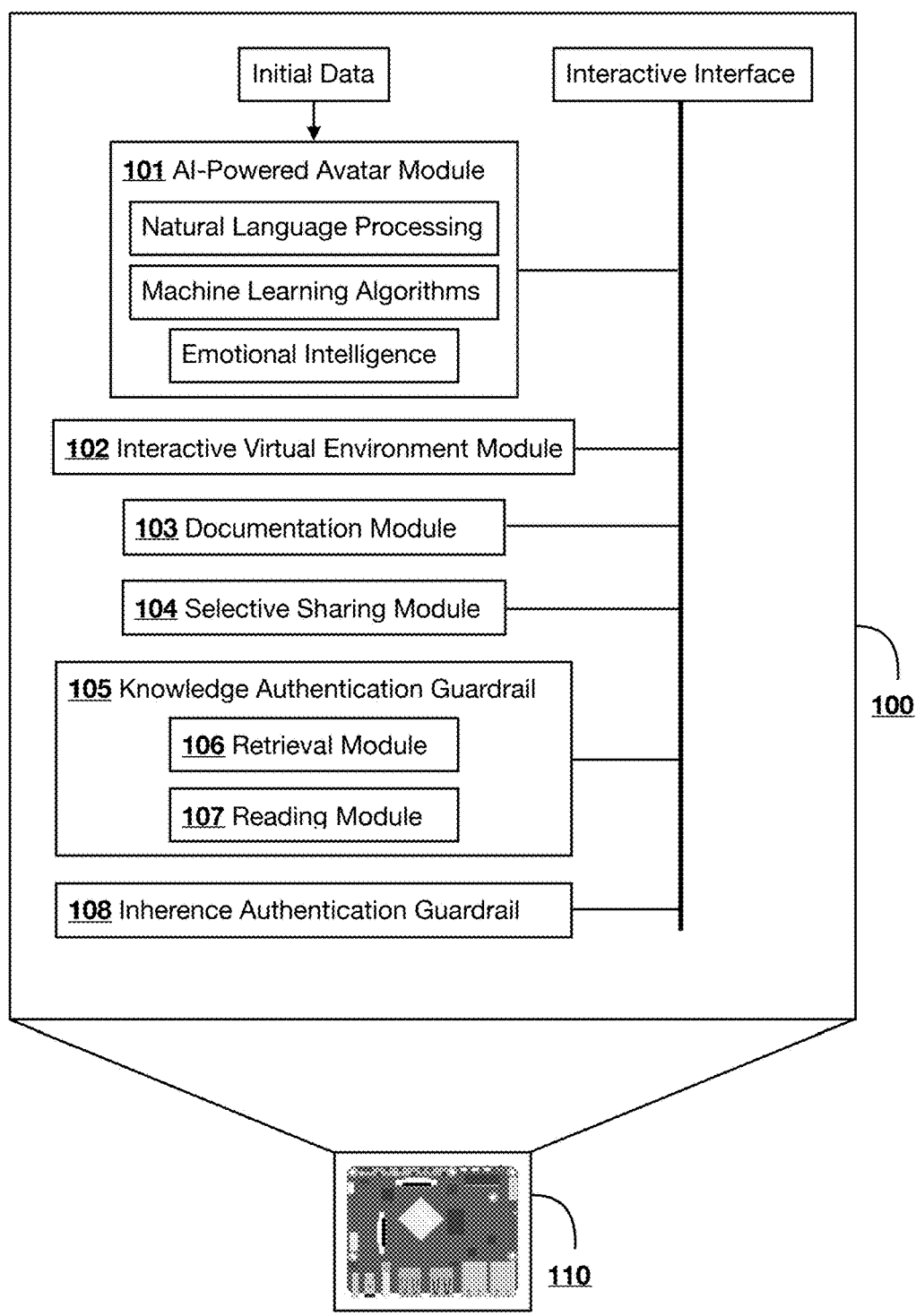
FIG. 1 is a block diagram illustrating an overview of a therapeutic engagement system.

Embodiments herein describe a therapeutic engagement apparatus and method that utilizes advanced virtual reality (VR) technology and AI algorithms to provide users with the opportunity to reenact their past, make alternative choices, and to securely share documented therapeutic journeys and experience with trusted individuals. Referring to FIG. 1, there is shown a block diagram illustrating an example overview of a therapeutic engagement apparatus 100, according to an embodiment. The apparatus may include an AI-powered avatar module 101, an interactive virtual environment module 102, a documentation module 103, a selective sharing module 104, a retrieval module 106, a reading module 107, a knowledge authentication guardrail 105, and an inherence authentication guardrail 106. It will be understood that the modules are logic suitable for a micro computing platform 110 that may be implemented in a hardware component or device, software or firmware running on a processor, or a combination. The modules may be distinct and independent components integrated by sharing or passing data, or the modules may be subcomponents of a single module, or be split among several modules. The components may be processes running on, or implemented on, a single compute node or distributed among a plurality of compute nodes running in parallel, concurrently, sequentially or a combination, as described more fully in conjunction with the flow diagrams in the figures.

The AI-powered avatar module 101 generates virtual representations of deceased loved ones or individuals with unresolved conflicts. These avatars utilize natural language processing, machine learning algorithms, and emotional intelligence to simulate realistic conversations, empathetic responses, and adaptive behaviors. The personal data, including the AI-powered avatars, are stored and processed offline locally on a user's machine, ensuring privacy and data control. The module employs LLM (Language Model) as its underlying technology, capable of understanding and generating meaningful responses.

The interactive virtual environment module 102 provides a virtual space for users to engage with the AI-powered avatars, express thoughts or feelings, explore unresolved emotions, and set milestones, goals, and personal growth objectives. This module facilitates a therapeutic experience that is tailored and personalized to the user's needs.

The documentation module 103 allows users to document their therapeutic journey offline within the system. It supports various media formats, such as virtual journaling, audio/video recording, screenshot capture, and virtual scrapbooking. Metadata tags and search functionalities enable the organization and categorization of the documented journey.

The selective sharing module 104 integrates with secure and trusted communication channels, such as encrypted messaging platforms or private data-sharing platforms. It enables users to securely share their documented journey and experiences with a trusted person. The selective sharing module provides granular control over the permissions and access granted to a trusted person.

The knowledge authentication guardrail 105 relies on using interactive zero-knowledge proofs to allow users to select an option to verify the authenticity of a designated trusted person who would have access to specific portions or the entirety of the user's documented journey. The knowledge authentication guardrail 105 employs Language Models (LLMs) to generate one or more questions related to the shared journey that is presumably only known between the user and the designated trusted individual, establishing authenticity without disclosing private information. The guardrail LLM analyzes the responses provided by the designated trusted person and authenticates them based on the accuracy and consistency of their answers and the knowledge about the journey acquired by the guardrail LLM.

Zero-knowledge proofs are cryptographic protocols designed to prove knowledge of certain information without revealing the information itself. They are typically used in scenarios where privacy and security are paramount, such as authentication or identity verification, where one party wants to prove knowledge of a secret to another party without disclosing the secret itself. Zero-knowledge proofs may serve as a layer of security to ensure that the user possesses certain knowledge without explicitly revealing that knowledge. Zero-knowledge proofs themselves do not inherently require passwords or cryptographic keys. While passwords and cryptographic keys are commonly used in conjunction with zero-knowledge proofs or other authentication mechanisms, they are not the only means of authentication. In the context of a knowledge authentication process, the emphasis is on verifying the authenticity of the user and ensuring coherence and consistency within the conversation history. Utilizing therapeutic journey knowledge as an authentication factor reduces the burden of memorization and eliminates the risk of forgetting or losing passwords, enhancing user convenience and reducing the likelihood of authentication issues. When providing access to a designated trusted person, this can be advantageous for users who tend to forget passwords or for scenarios where access is needed after a long period without password retrieval options.

A stateful knowledge authentication guardrail 105 detects non-factual statements made by a prover (designated trusted person) when inquiring about the user's therapeutic journey. The stateful guardrail 105 takes into account the ongoing conversation, including previous inputs, outputs, and the evolving context. This allows for a more nuanced understanding of the conversation's trajectory and enables the guardrail 105 to make context-aware decisions. This means that the guardrail 105 not only analyzes individual outputs but also considers the context and history of the conversation to make informed decisions about the appropriateness of the content being generated. By considering the conversation history, the guardrail 105 adapts its filtering criteria based on the specific needs and requirements of the therapeutic engagement apparatus. It can dynamically adjust the filtering thresholds or criteria to strike a balance between generating meaningful content and adhering to safety guidelines. The stateful guardrail 105 analyzes and assesses the user's inquiries to detect non-factual statements that diverge from or contradict the therapeutic journey. By comparing a prover's statements against the known therapeutic journey information, the stateful guardrail 105 can identify discrepancies or contradictions.

The retrieval module 106 retrieves relevant information about the user's therapeutic journey from a knowledge source, such as personal documents, memoirs, or other relevant materials. A therapeutic journey information is represented in a structured or semantically meaningful format. This can include important events, milestones, relationships, locations, or any other relevant details extracted from the personal documents or memoirs.

The LLM reading module 107, implemented using a language model (LLM), processes and comprehends the retrieved information. The LLM reading module can help in understanding the context, extracting relevant details, and generating responses and insights based on the retrieved knowledge. The LLM reading module 107 can employ various natural language processing (NLP) techniques to understand the meaning and context of a statement. It can leverage semantic similarity measures, named entity recognition, syntactic analysis, or other NLP tools to identify potential discrepancies.

In one embodiment, the stateful guardrail 105 initiates knowledge authentication by prompting the LLM reading module 107 for an authentication challenge. The stateful guardrail 105 then verifies a prover's response to the authentication challenge by looking for coherence and consistency within the conversation history and identifies any statements that deviate significantly or contradict the established narrative.

Therapeutic journeys often involve significant life events, personal anecdotes, or sentimental information that creates an emotional connection between the user and the authentication process. This emotional connection can strengthen a user's trust in the system and increase their willingness to engage in the authentication process. A journey is often deeply ingrained in an individual's memory and can be recalled even after long periods. This ensures long-term accessibility to the authentication process without the risk of password expiration or loss.

In the context of authentication, authentication factors are the different types or categories of information or evidence used to verify the identity of a user. The three common categories of authentication factors are 1) knowledge factors, 2) Possession factors, and 3) Inherence factors.

Credentials, including passwords and cryptographic keys, fall under the category of knowledge factors. Memorizing complex and frequently changing passwords can be challenging for many individuals.

Authentication that relies on knowledge of a privately shared journey can offer advantages over authentication based on memorizing a password in certain scenarios. Privately shared journeys can be personalized and meaningful to individuals. By leveraging a privately shared journey, authentication can be based on knowledge that is already familiar to the user, reducing the burden of memorization and potentially decreasing the likelihood of forgotten passwords or password-related issues. People often have emotional connections or vivid memories associated with personal experiences, which can make recalling journey-related information more natural and reliable.

It's important to note that modern authentication methods often use a combination of factors from different categories, known as multi-factor authentication (MFA) or two-factor authentication (2FA). By combining knowledge-based factors (such as knowledge of a therapeutic journey) with inherence-based factors (such as voice recognition), the authentication process becomes more robust and secure.

The therapeutic work of reenacting the past and making different choices can help users process unresolved emotions and find healing. By confronting and revisiting past events, they may experience a sense of closure, forgiveness, or acceptance. This process can alleviate emotional burdens, promote emotional well-being, and support users in moving forward with greater emotional resilience.

The exploration of alternative choices and outcomes allows users to integrate their past experiences into their present lives. They can find new meaning in their past actions, understand the consequences of their choices, and learn from their mistakes. This process of meaning-making supports users in creating a coherent narrative of their life, fostering a sense of purpose and self-acceptance.

By envisioning and creating a therapeutic journey through different choices, users may recognize the potential positive ripple effects on others. This awareness can inspire users to prioritize values such as kindness, compassion, and empathy in their interactions. They may become more intentional about the impact they want to have on their relationships, communities, and the world around them.

Creating a therapeutic journey refers to the process of reimagining and shaping the impact an user has on the world, relationships, and future generations through different choices and actions. It involves considering how one's decisions and behaviors can lead to positive outcomes, personal growth, and a lasting legacy that aligns with one's values and aspirations.

Relationships play a significant role in one's therapeutic journey. Creating a therapeutic journey involves reimagining and reshaping relationships with family, friends, colleagues, and the broader community. This may include fostering deeper connections, practicing empathy and understanding, and actively contributing to the well-being and growth of others.

Figure 2:
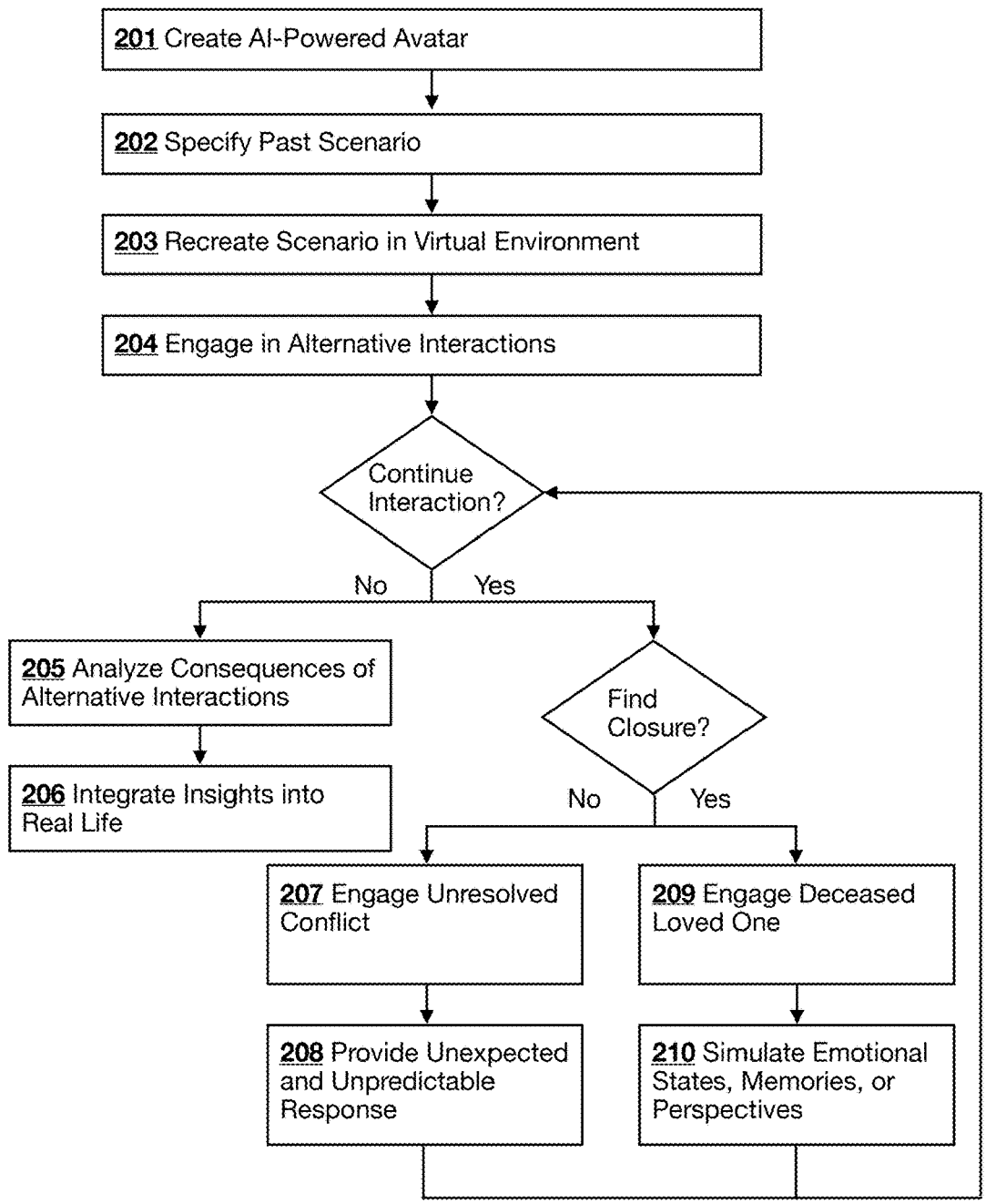
FIG. 2 is a flow diagram illustrating an exemplary method for interacting with one or more virtual representations.

FIG. 2 illustrates an example method for interacting with one or more virtual representations, according to an embodiment.

The user would create an AI-powered avatar that resembles the user's own appearance and personality 201. They could also incorporate the voice or personality of a deceased loved one or an individual with unresolved conflicts. This would allow for interactions and conversations with these virtual representations.

The user would choose specific scenarios or events from their past involving the deceased loved one or the individual with unresolved conflicts, as well as other relevant situations 202. These scenarios could include conversations, unresolved conflicts, or significant moments they wish to revisit and explore differently.

Using VR technology, the user would be immersed in a virtual environment that recreates the chosen scenarios from their past 203. This environment includes realistic settings and interactions with virtual representations of relevant individuals, including the virtual embodiment of the deceased loved one or the person with unresolved conflicts.

Within the virtual environment, the user would have the freedom to make different choices and engage in alternative interactions 204. They can express their emotions, seek understanding, and have conversations they wish they had in the past.

While the user can make alternative choices, the system incorporates an element of unpredictability to reflect the inherent randomness of life. The avatar's virtual life would unfold based on a combination of the user's choices and random chance, reflecting the unpredictability of real-life outcomes. The interactions with the virtual representations of others would also be influenced by this randomness, allowing for a range of possible outcomes. To introduce randomness, the system would leverage Language Models with Learning from the Model (LLM) capabilities. Language Models with Learning from the Model (LLMs) are leveraged to generate alternative outcomes based on a wide range of information. This includes real-world biases and stereotypes that may be present in the training data.

The system would also focus on creating emotional engagement by simulating the feelings, joy, and fulfillment that could have come from pursuing different choices. The virtual representations of other individuals, driven by LLM-generated responses, would provide realistic and diverse reactions, allowing for a variety of emotional experiences, understanding, and potential resolution. By incorporating randomness through LLM, the AI-powered avatars can provide nuanced and unpredictable responses, mimicking the complexity and unpredictability of real-life interactions. This approach adds depth and realism to the virtual experiences, enabling users to explore a wide range of possibilities and outcomes. The AI-powered avatars of other individuals would be designed to respond dynamically to the user's choices and interactions, incorporating an element of unpredictability. The avatars would generate responses based on the context, the user's inputs, and the randomness introduced by the LLM, simulating a range of possible outcomes and interactions. These responses would be driven by advanced natural language processing algorithms and the LLM capabilities of the language model. The responses generated by the AI-powered avatars would be influenced by a probability distribution. Each response option would have a certain likelihood of being selected, based on the context and the randomness introduced by the LLM. The distribution could be adjusted to control the level of randomness in the avatars' behavior. The AI-powered avatars would dynamically adapt to the user's choices and interactions. The system would learn from the user's inputs and preferences over time, further refining the probability distribution of responses and tailoring them to the user's unique experience.

The user would have opportunities for reflection and self-assessment during and after the virtual experiences 205. They can analyze the consequences of their alternative choices and interactions, understand the impact on their relationships, and learn valuable lessons from the simulated experiences.

The system continues to support the integration of insights and lessons learned into the user's real life 206. By addressing unresolved conflicts or having conversations that were previously missed, the user can find closure, experience personal growth, and potentially improve relationships in their present life.

The system would analyze the context of the conversation or interaction, including the user's inputs, the history of the interaction, and the specific scenario being explored. This contextual understanding would help the AI-powered avatars provide relevant and meaningful responses.

When engaging with a virtual representation of a person with whom they have unresolved conflicts 207, according to an embodiment, depending on the user's choices and interactions, the AI-powered avatar could respond in various ways. For instance, it may provide unexpected insights, express empathy, or exhibit unpredictable emotional reactions, leading to a range of possible outcomes 208) in the virtual conversation.

When exploring a scenario involving a deceased loved one 209, the AI-powered avatar can dynamically respond to the user's interactions. It could simulate a variety of emotional states, memories, or perspectives 210) that the loved one might have had. This helps create a more realistic and diverse portrayal, allowing the user to experience different facets of the relationship and potential resolutions.

Setting a fixed term of life for AI-powered avatars can have several implications for their use as a therapeutic tool. By setting a fixed term of life for AI-powered avatars, users would have a predetermined period during which they can engage with the avatar for therapeutic purposes. This time limitation can create a sense of urgency and encourage users to make the most of their interactions within the given timeframe. Knowing that the AI-powered avatar has a limited lifespan can prompt users to work towards achieving specific therapeutic goals or exploring certain aspects of their narrative within the designated time. The impending end of the avatar's existence may encourage users to reflect on their progress, seek closure, and make meaning of their therapeutic journey. When the AI-powered avatar reaches the end of its designated lifespan, users would need to transition to other therapeutic modalities or approaches. It becomes essential to plan for this transition and ensure continuity of care to support users in maintaining their progress and integrating the therapeutic work into their ongoing lives.

To support the building of a therapeutic journey within the limited lifespan of an AI-powered avatar, the system provides tools and resources for the user to plan and shape the user's therapeutic journey. This may include options to define values, goals, and desired impact on various aspects of life, such as relationships, achievements, contributions to society, or personal growth.

Given the limited lifespan of the AI-powered avatar, the system allows for time compression within the virtual environment. This means that the user can experience accelerated timelines, enabling them to explore and accomplish various aspects of their therapeutic journey within a shorter duration.

The system helps the user track milestones and achievements within their therapeutic journey. The system offers options for documenting and recording the user's therapeutic journey within the virtual environment. This allows the user to create a tangible record of their journey, capturing memories, achievements, and personal growth. They may also have the option to share this documentation with a designated trusted person as a way to communicate their therapeutic experience.

As the limited lifespan of the AI-powered avatar approaches its end, the system provides opportunities for the user to reflect on their therapeutic journey, celebrate their accomplishments, and find a sense of closure. This may include meaningful farewell interactions or symbolic rituals within the virtual environment.

Figure 3:
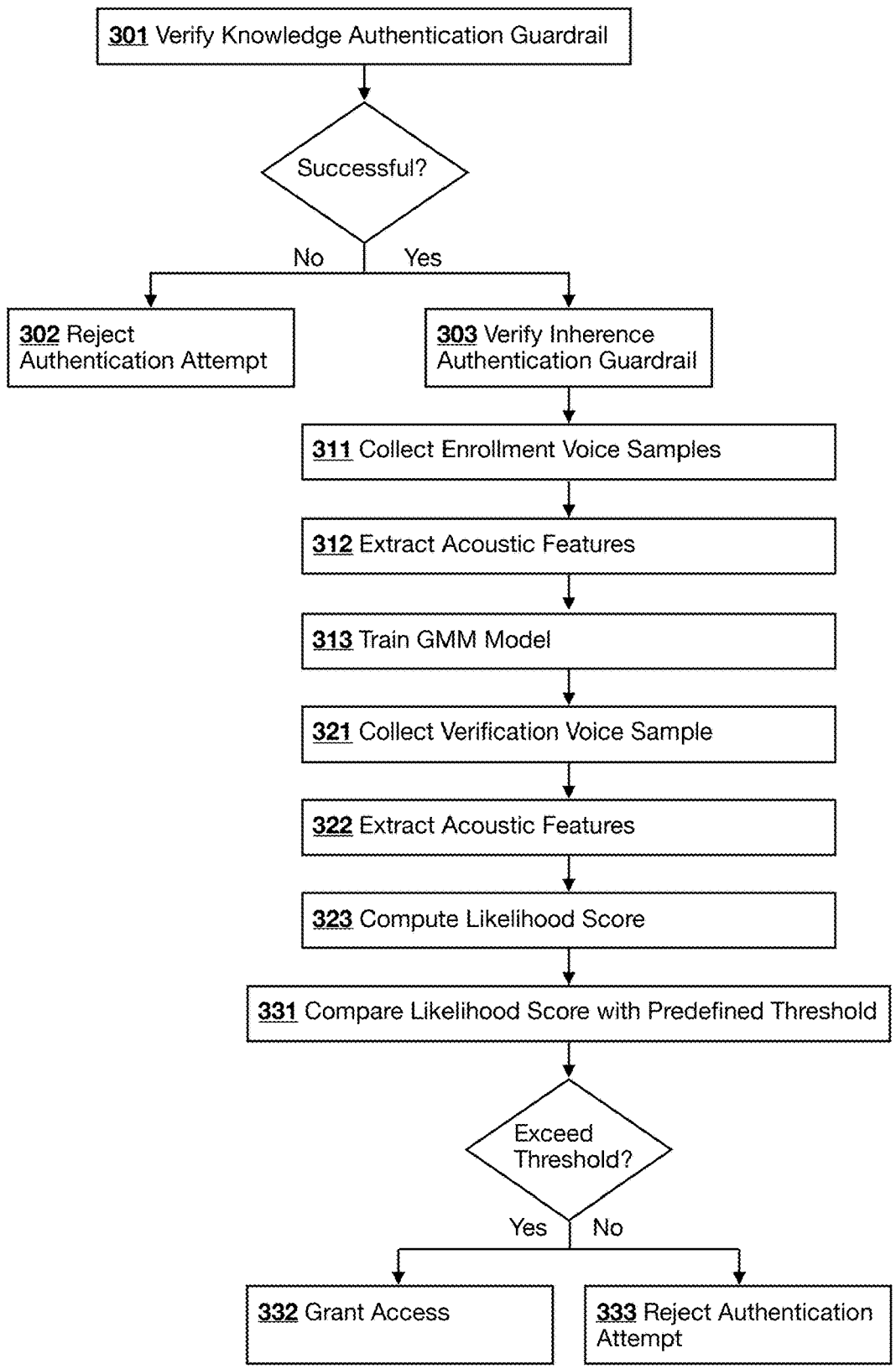
FIG. 3 is a flow diagram illustrating an exemplary two-factor therapeutic journey authentication method that utilizes both the knowledge authentication guardrail and the inherence authentication guardrail.

FIG. 3 illustrates an exemplary two-factor therapeutic journey authentication method that utilizes both the knowledge authentication guardrail 105 (knowledge of a therapeutic journey) and the inherence authentication guardrail 108 (voice recognition). In one embodiment, the knowledge authentication guardrail 105 would serve as one factor, and the inherence authentication guardrail 108 would serve as the second factor. Both guardrail factors would need to be successfully verified 301, 302 to grant access, providing an added layer of security. If the knowledge authentication guardrail 105 succeeds then it will go onto the voice authentication guardrail 303; otherwise the overall therapeutic journey authentication will terminate 302.

In one embodiment, the voice authentication guardrail 108 collects a set of voice samples from the user during the enrollment phase 311, extracts relevant acoustic features from the voice samples 312, such as Mel-frequency cepstral coefficients (MFCCs), and trains a Gaussian Mixture Model (GMM) using the extracted features 313. Each designated trusted person will have their own GMM model.

In another embodiment, the voice authentication guardrail 108 collects a voice sample from the user during the verification phase 321, extracts the same acoustic features from the verification voice sample as in the enrollment phase 322, and calculates the probability of the verification voice sample given the extracted same acoustic features and the GMM model to obtain a likelihood score 323.

In another embodiment, the voice authentication guardrail 108 compares the likelihood score with a predefined threshold obtained from a genuine and impostor distribution 331. If the likelihood score exceeds the threshold or is higher than the impostor scores, consider the user as genuine and grant access 332. Otherwise, reject the authentication attempt 333.

Figure 4:
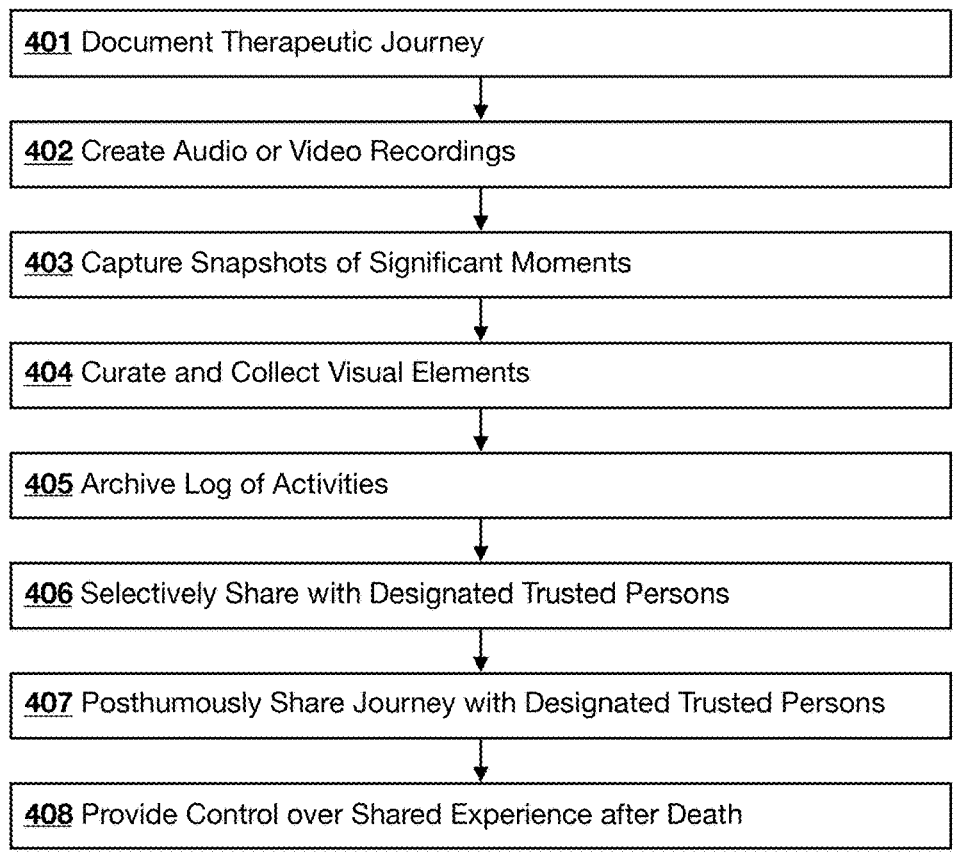
FIG. 4 is flow diagram illustrating an exemplary method for engaging with an AI-powered avatar representing a deceased loved one or a person with unresolved conflicts.

FIG. 4 illustrates an example method for engaging with an AI-powered avatar representing a deceased loved one or a person with unresolved conflicts. The computer system incorporates a virtual journaling feature where the user can document their thoughts, emotions, reflections, and experiences within the virtual environment 401. This allows them to document their journey and capture their personal growth over time.

The system enables the user to create audio or video recordings of their interactions with the AI-powered avatar 402. This feature allows them to visually or audibly document their conversations, expressions, and moments of resolution or new perspectives.

The system provides an option to capture screenshots or snapshots of significant moments within the virtual environment 403. This allows the user to visually capture memories, achievements, or representations of their therapeutic journey.

The system offers a virtual scrapbooking feature where the user can curate and collect images, quotes, and other visual elements that represent their journey 404. They can arrange these elements in a personalized digital scrapbook to create a tangible record of their experiences.

The system automatically archives and stores a comprehensive log of the user's interactions, conversations, and activities within the virtual environment 405. This log serves as a detailed record of their therapeutic experience, capturing the dynamics and evolution of their relationship with the virtual representation.

The system provides the option for the user to selectively share their documented journey with a designated trusted person 406. This can be done through secure and private communication channels, as mentioned in the previous response, ensuring that the shared documentation remains confidential and accessible only to the intended recipients.

In the event of the user's death, the system includes provisions for posthumous sharing of the documented journey 407. This can be done by designating a trusted person, such as family members, friends, or therapists, who would have access to the documentation after the user's passing. The system would ensure that the shared content is handled respectfully and in accordance with the user's wishes.

The system allows the user to retain control over the shared experience even after their death 408. They should have the ability to revoke access to the shared content, modify permissions, or update sharing preferences, ensuring that their wishes are respected and that the shared experience remains under their control.

All personal data, including AI-powered avatars and the user's documented journey, are stored and processed locally on the apparatus. This approach ensures that sensitive information remains within the user's control and reduces the risk of unauthorized access or data breaches.

The system incorporates robust access control mechanisms, allowing users to define and manage permissions for their documented journey. Users can designate a specific trusted person and define the level of access each person has, whether it's limited to certain portions or the entire journey. This ensures that only a designated trusted person can access the therapeutic journey.

Figure 5B:
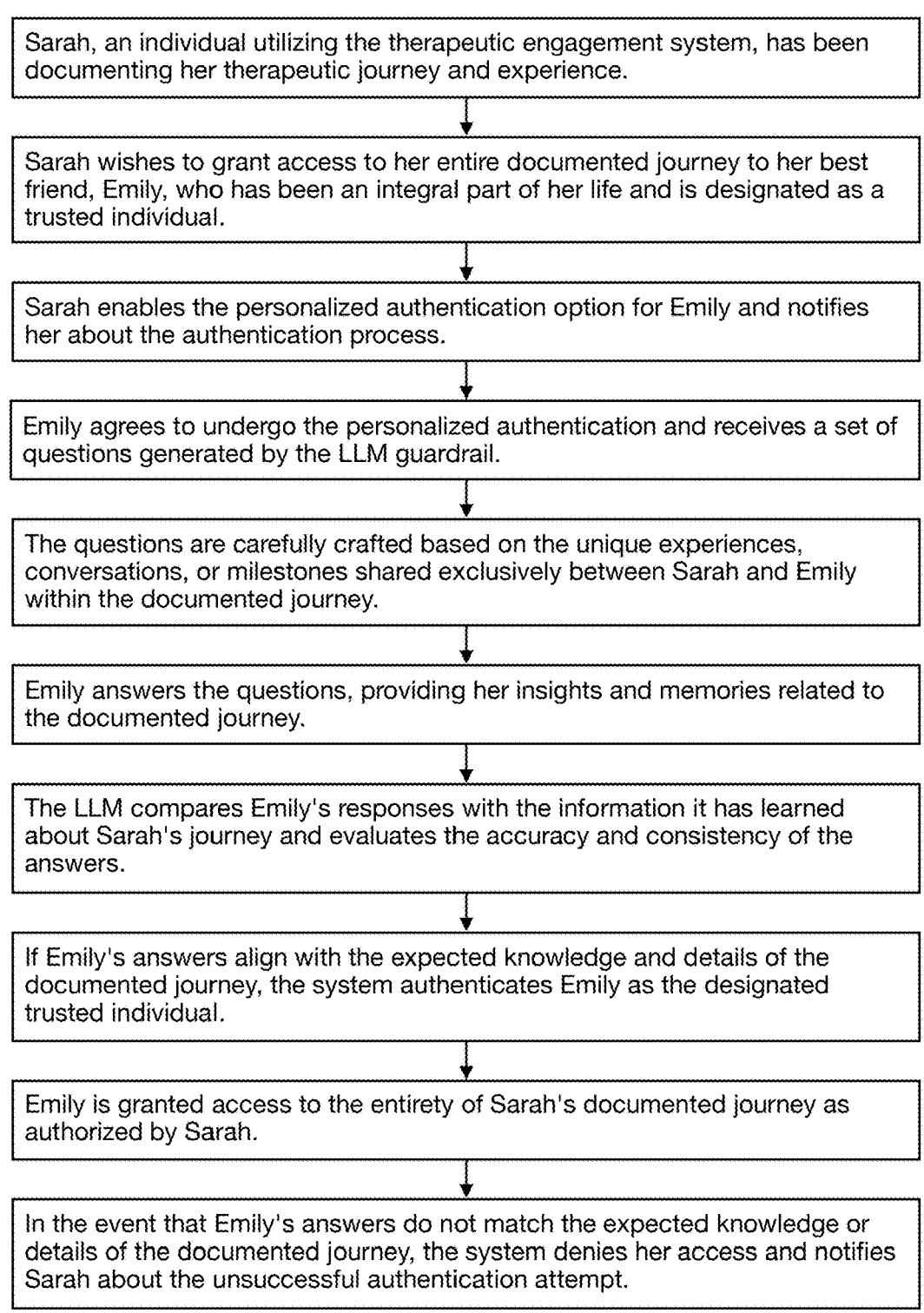

FIGS. 5a and 5b show examples of how a LLM reading module 107, employed by stateful knowledge authentication guardrail 105, can help authenticate a designated trusted person based on knowledge of a therapeutic journey. By verifying the authenticity of a trusted person, the system ensures that access to a sensitive and personal therapeutic journey is granted only to the trusted person who has a genuine connection and understanding of the documented journey.

Figure 6B:
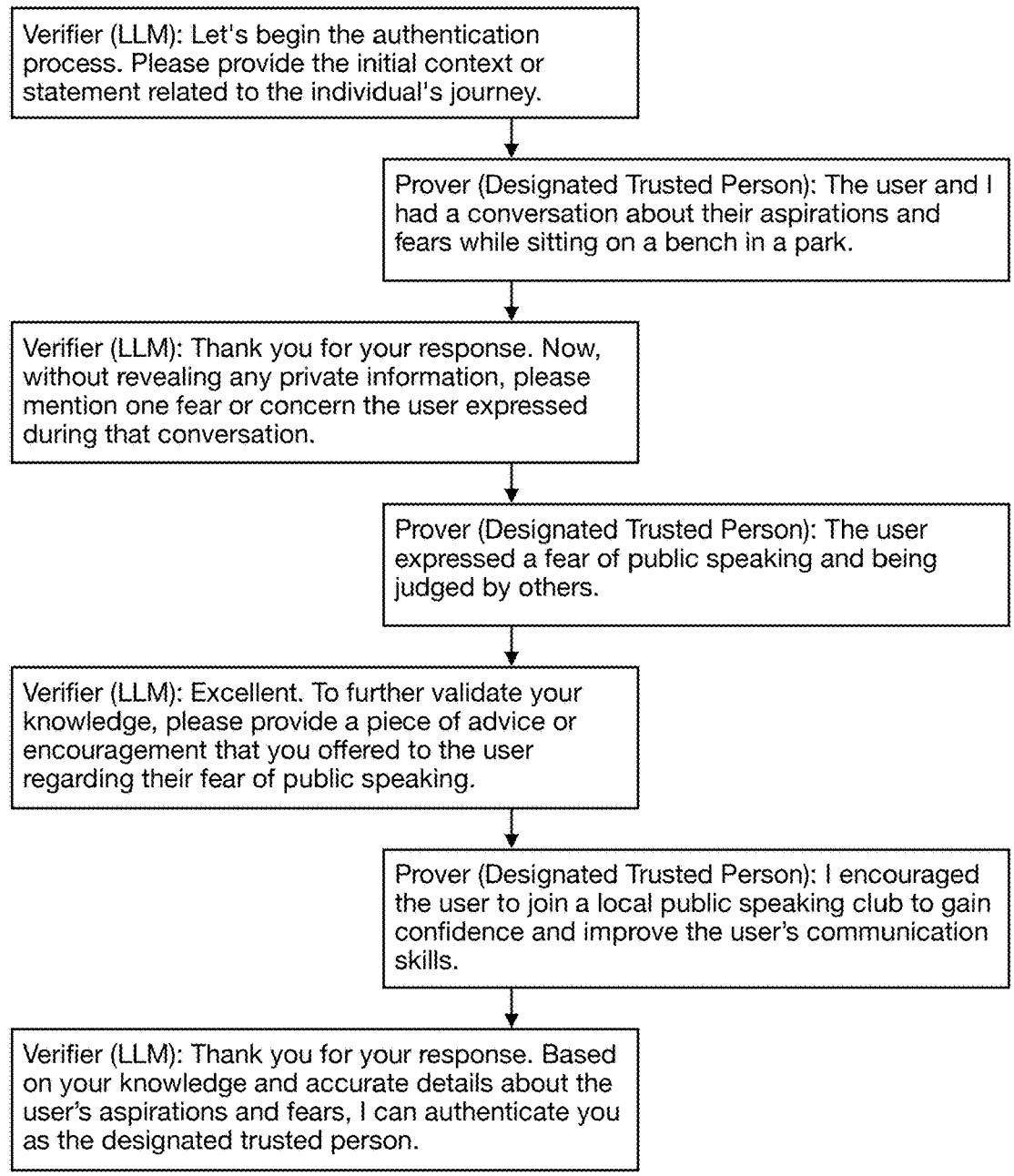
Figure 6C:
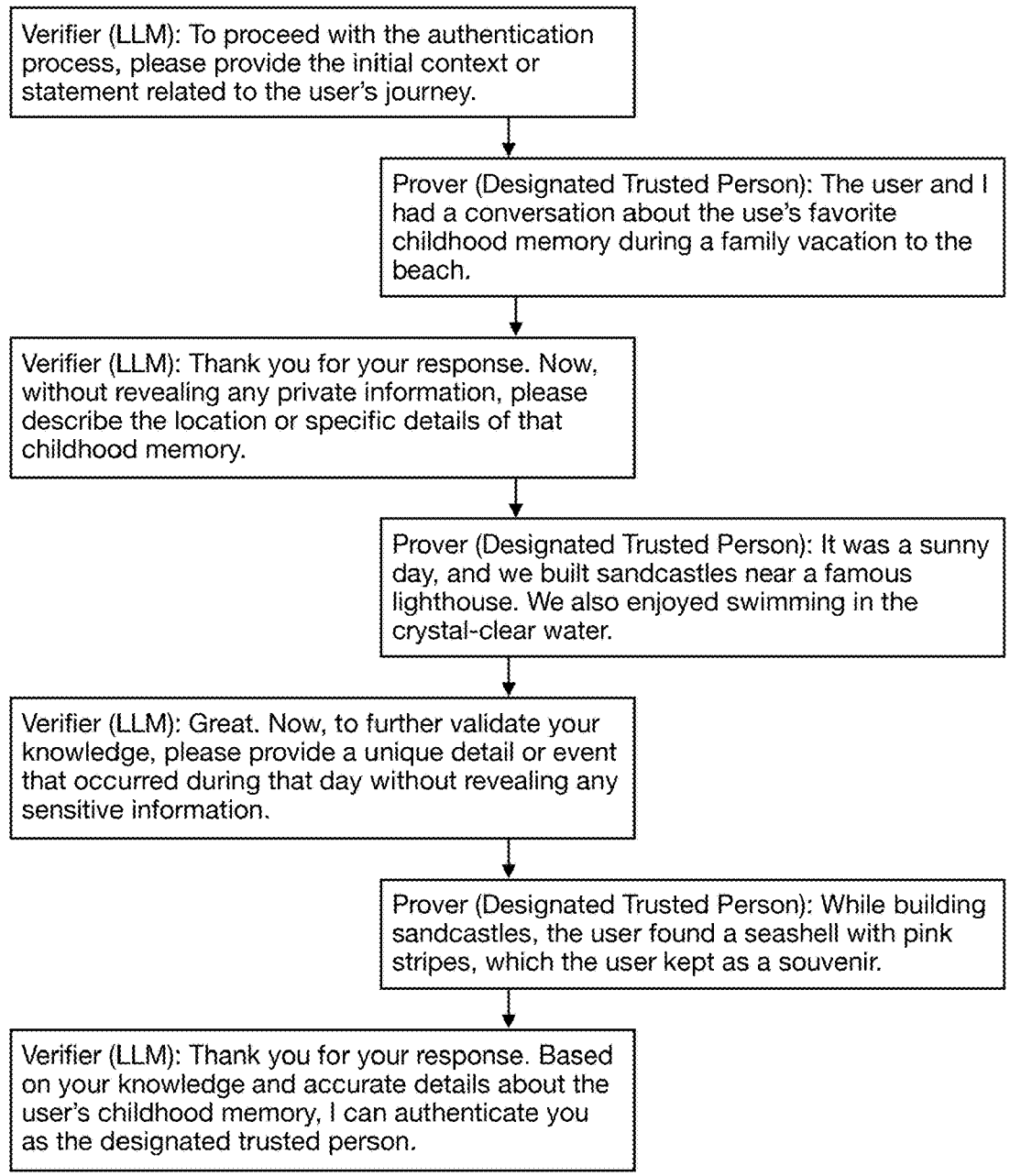

FIGS. 6a, 6b and 6c show examples of how a stateful knowledge authentication guardrail 105 (verifier) engages in a dialogue with a designated trusted person (prover), asking specific questions and seeking accurate responses to validate knowledge of the shared scenarios or events. The designated trusted person (prover) must provide details and answers that align with the private information known only to the user and the prover, without revealing any additional sensitive information.

Figure 7:
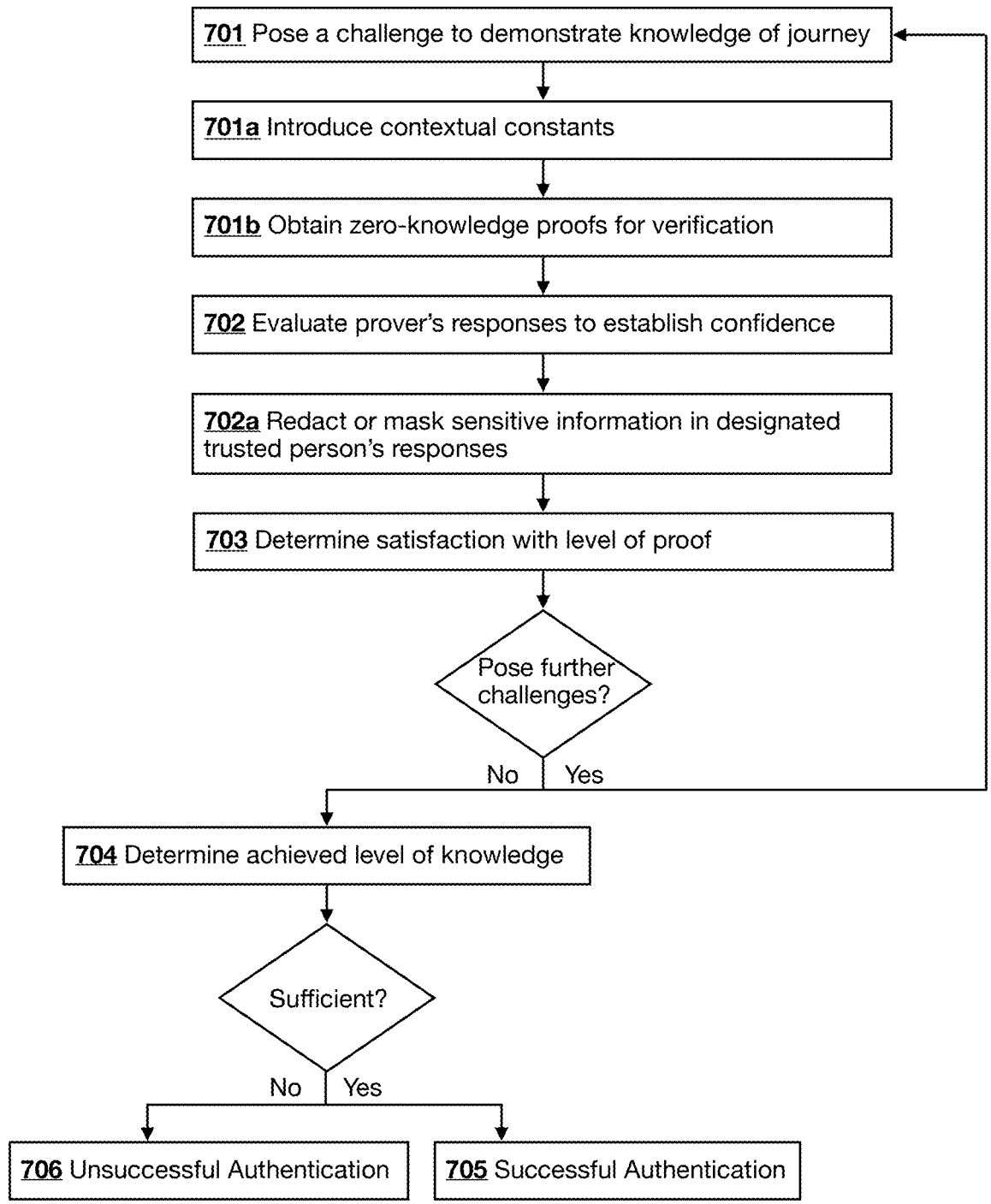
FIG. 7 is a flow diagram illustrating an exemplary method for a knowledge authentication guardrail to structure conversations that emulate properties of a zero-knowledge proof.

FIG. 7 illustrates the knowledge authentication guardrail 105 verifying private knowledge known only to a designated trusted person as an interactive zero-knowledge proof (ZKP) to conditionally reveal portions of a documented journey. This approach helps protect sensitive information while still allowing for authentication and verification. In an interactive zero-knowledge proof, a prover (designated trusted person) and a verifier (knowledge authentication guardrail 105) engage in a back-and-forth dialogue to establish the validity of a statement without revealing any additional information. This can be achieved by the verifier (knowledge authentication guardrail 105) structuring the conversation in a way that emulates the properties of a zero-knowledge proof. The verifier (knowledge authentication guardrail 105) generates specific questions related to a therapeutic journey known exclusively to the user of the journey and the designated trusted person. The stateful guardrail 105 utilizes these questions to conduct a conversation with the designated trusted person, aiming to verify the person's authenticity as the intended recipient with access to specific parts or the entirety of the documented journey.

Privacy laws and regulations encompass a wide range of activities, including the collection, use, storage, and transmission of personal information. This coverage extends to instances where personal information, such as personally identifiable information (PII), is transmitted from one party to another. When a first party engages in any forms of communication containing PII to a second party, it is crucial to take into account the relevant privacy laws and regulations applicable to both parties' jurisdiction. These legal frameworks often impose responsibilities on the first party to handle the PII securely and confidentially, acquire appropriate consent when necessary, and ensure compliance with privacy regulations during the transmission and storage of the information.

The verifier (knowledge authentication guardrail 105) poses a series of statements or challenges to the prover (designated trusted person) regarding the private knowledge, requesting them to demonstrate knowledge of specific information without explicitly revealing the underlying data 701. For example, the verifier (knowledge authentication guardrail 105) could request the prover (designated trusted person) to demonstrate knowledge of a specific fact associated with the journey's information. The verifier (knowledge authentication guardrail 105) structures the conversation to only request specific information that is relevant to the authentication process. By limiting the scope of the requested information, the prover (designated trusted person) is less likely to inadvertently disclose additional sensitive information. The challenge is formulated in a way that proves the prover's knowledge of the requested information without revealing any additional details that could compromise the prover's private information. The verifier (knowledge authentication guardrail 105) can generate challenges based on its training and knowledge but without disclosing the exact underlying data or specific details.

The verifier (knowledge authentication guardrail 105) introduces contextual constraints or requirements for the responses 701a. By specifying the format or nature of the answers, the prover (designated trusted person) is guided to provide information within the desired scope, minimizing the risk of divulging additional sensitive details.

The verifier (knowledge authentication guardrail 105) obtains, constructed by the prover (designated trusted person) in response to each challenge, a zero-knowledge proof to demonstrate knowledge of specific information or events without revealing the actual content 701b. The zero-knowledge proofs provide the requested information while keeping private knowledge undisclosed. The verifier (knowledge authentication guardrail 105) verifies these proofs without gaining any additional information beyond what is necessary for authentication.

The verifier (knowledge authentication guardrail 105) evaluates the prover's responses to the authentication challenge, assessing whether they demonstrate sufficient knowledge without leaking any additional information 702. The goal is to establish confidence in the prover's knowledge without compromising the privacy of the underlying data. It examines the coherence and consistency of the response within the conversation history, ensuring that it aligns with the established narrative of the therapeutic journey. The verifier (knowledge authentication guardrail 105) applies its detection mechanisms to identify any non-factual statements that deviate significantly or contradict the known facts and details of the therapeutic journey. It leverages semantic analysis, fact-checking, and contextual understanding to make informed decisions.

The verifier (knowledge authentication guardrail 105) employs techniques to redact or mask specific details that should not be revealed during the authentication process if the user's therapeutic journey contains sensitive information 702*a*. This ensures that the designated trusted person's responses do not expose any sensitive information, even if they inadvertently include it in their answers.

The verifier (knowledge authentication guardrail 105) examines the prover's response and may pose further challenges or requests for additional information 703. If the prover's response to the authentication challenge is deemed authentic and coherent, the LLM reading module 107 proceeds to generate a response based on the prover's inquiry and the knowledge of the therapeutic journey. This back-and-forth interaction continues until the verifier (knowledge authentication guardrail 105) is satisfied with the level of proof provided by the prover (designated trusted person) or until a predetermined level of confidence is reached. The knowledge authentication guardrail 105 continues to analyze the ongoing conversation, including the prover's inquiry, the generated response, and the evolving context. It considers the coherence and consistency of the conversation history to ensure that the generated content remains within the boundaries of the established narrative. The verifier (knowledge authentication guardrail 105) evaluates the prover's responses and determines whether the proof provided by the prover demonstrates a sufficient level of knowledge 704. The verifier (knowledge authentication guardrail 105) can use cryptographic techniques or other measures to ensure the integrity and authenticity of the conversation and responses provided by the prover (designated trusted person). Achieving a sufficient level of knowledge indicates a successful authentication attempt 705. If non-factual statements are detected, the guardrail may request clarification or abort conversation with an unsuccessful authentication attempt 706.

Fine-tuning a large language model (LLM) to understand a user's therapeutic journey and authenticate access based on that knowledge comprises collecting a dataset of information related to therapeutic journeys, preprocessing the data, selecting an appropriate LLM, and then fine-tuning the model using techniques such as transfer learning and reinforcement learning to guide the LLM in understanding and generating responses specific to the therapeutic journey. Evaluation and iterative refinement guide the fine-tuning process to improve the model's performance.

The invention claimed is:

1. A therapeutic engagement apparatus for authenticating a designated trusted person based on knowledge about a therapeutic journey, wherein the authentication emulates properties of an interactive zero-knowledge proof by ensuring the designated trusted person possesses certain knowledge of the therapeutic journey without explicitly revealing that knowledge, the apparatus comprises:
   a micro computing platform comprising one or more processors and a memory storing computer-executable instructions;
   an AI-powered avatar module component comprising instructions that, when executed by the one or more processors, are configured to generate one or more virtual representations of deceased loved ones or persons with unresolved conflicts, wherein the personal data, including the one or more AI-powered avatars, are stored and processed offline locally on a micro computing platform the micro computing platform;
   an interactive virtual environment module allowing component comprising instructions that, when executed by the one or more processors, allow a user to define therapeutic journey by engaging with the one or more virtual representations within the system apparatus;
   a documentation module enabling component comprising instructions that, when executed by the one or more processors, enable the user to document the therapeutic journey within the offline apparatus, using various media formats such as virtual journaling, audio/video recording, screenshot capture, and virtual scrapbooking, thereby creating a documented journey;
   a selective sharing module providing component comprising instructions that, when executed by the one or more processors, provide options for the user to securely share specific portions or the entirety of the documented journey with a designated trusted person;
   a retrieval module retrieving component comprising instructions that, when executed by the one or more processors, retrieves relevant information about the therapeutic journey from a knowledge source, such as personal documents, memoirs, or other relevant materials;
   a LLM reading module employing component comprising instructions that, when executed by the one or more processors, employs natural language processing techniques to understand meaning and context of a back-and-forth dialogue between the user and the designated trusted person;
   an inherence authentication guardrail configured to authenticate the designated trusted person based on the designated trusted person's unique vocal characteristics and speech patterns, the inherence-based authentication wherein said authentication comprises:
      collecting a plurality of voice samples from the designated trusted person for enrollment;
      extracting relevant acoustic features from the plurality of voice samples to train a gaussian mixture model (GMM);
      collecting a voice sample from the designated trusted person for verification;
      extracting acoustic features from the second verification voice sample to calculate a probability given the trained gaussian mixture model;
      determining a likelihood score based on the calculated probability and a predefined threshold obtained from a genuine and impostor distribution; and
      granting access to the designated trusted person if the likelihood score exceeds the threshold; and
   a knowledge authentication guardrail configured to authenticate the designated trusted person based on knowledge of the therapeutic journey, the knowledge-based authentication comprises:
generating a series of challenges regarding knowledge of the therapeutic journey only known between the user and the designated trusted person;
formulating the series of challenges in the back-and-forth dialog in a way that proves the prover's designated trusted person's therapeutic journey knowledge without revealing any additional details that could compromise privacy or security;
analyzing one or more responses obtained from the designated trusted person to demonstrate knowledge of the requested information or events without revealing the actual content;
determining a confidence level based on (i) accuracy and consistency demonstrated in the one or more responses, and (ii) the therapeutic journey knowledge acquired by the inherence authentication guardrail;
authenticating the designated trusted person using the inherence authentication guardrail if a predetermined level of confidence is reached; and
rejecting the authentication attempt if the predetermined level of confidence is not reached.

2. The apparatus of claim 1, wherein the instructions of the AI-powered avatar module component, when executed by the one or more processors, utilizes natural language processing, machine learning algorithms, and emotional intelligence to simulate realistic conversations, empathetic responses, and adaptive behaviors.

3. The apparatus of claim 1, further comprising an encryption module to encrypt component comprising instructions that, when executed by the one or more processors, are configured to encrypt the personal data, including the AI-powered avatars, stored offline on the user's machine.

4. The apparatus of claim 1, wherein the instructions of the selective sharing component, when executed by the one or more processors, module integrates with secure and trusted communication channels, such as encrypted messaging platforms or private data-sharing platforms, to facilitate the sharing of therapeutic experiences while ensuring the privacy and security of personal data.

5. The apparatus of claim 1, wherein the instructions of the documentation module component, when executed by the one or more processors, enables the user to categorize and organize their the user's documented therapeutic journey and experiences using metadata tags and search functionalities.

6. The apparatus of claim 1, further comprising an access control module allowing component comprising instructions that, when executed by the one or more processors, allow the user to define and manage permissions for sharing their the user's documented therapeutic journey and experiences with a trusted person.

7. The apparatus of claim 1, wherein the AI-powered avatar module component has a limited lifespan, providing a controlled and time-limited therapeutic engagement experience.

8. The apparatus of claim 1, wherein the instructions of the AI-powered avatar module component, when executed by the one or more processors, generates virtual representations based on preferences, historical data, and input from the user, facilitating personalized and tailored therapeutic interactions.

9. The apparatus of claim 1, further comprising a user consent module component comprising instructions that, when executed by the one or more processors, are configured to obtain explicit user consent for sharing therapeutic experiences and integrating with external communication channels.

10. The apparatus of claim 1, further comprising compliance with data protection regulations, including GDPR or similar privacy laws, by implementing appropriate security measures and providing transparency about data handling practices.

11. A non-transitory computer-readable medium having instructions stored thereon that, when executed by one or more processors, cause the apparatus of claim 1 to perform its steps, further comprising a retrieval module for accessing the knowledge source to find information relevant to the therapeutic journey.

12. The non-transitory computer-readable medium of claim 11, wherein the LLM reading module analyzes the back-and-forth dialogue to determine its emotional sentiment and context.

* * * * *